(12) United States Patent
Popov et al.

(10) Patent No.: US 8,648,314 B1
(45) Date of Patent: Feb. 11, 2014

(54) FAST NEUTRON IMAGING DEVICE AND METHOD

(75) Inventors: Vladimir Popov, Newport News, VA (US); Pavel Degtiarenko, Williamsburg, VA (US); Igor V. Musatov, Newport News, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 194 days.

(21) Appl. No.: 13/136,074

(22) Filed: Jul. 22, 2011

(51) Int. Cl.
*G01T 3/06* (2006.01)

(52) U.S. Cl.
USPC .................................................. 250/390.11

(58) Field of Classification Search
USPC .................................................. 250/390.11
See application file for complete search history.

(56) References Cited

U.S. PATENT DOCUMENTS

| | | | |
|---|---|---|---|
| 4,535,246 A | 8/1985 | Shani | |
| 5,410,156 A | 4/1995 | Miller | |
| 5,606,167 A | 2/1997 | Miller | |
| RE36,201 E | * 4/1999 | Miller | 250/390.04 |
| 6,747,263 B1 | 6/2004 | Popov | |
| 7,313,221 B2 | 12/2007 | Sowerby et al. | |
| 7,636,486 B2 | 12/2009 | Steinberg et al. | |
| 2004/0021083 A1 | * 2/2004 | Nelson et al. | 250/370.09 |

OTHER PUBLICATIONS

Anger, Scintillation Camera, The Review of Scientific Instruments, vol. 29, No. 1, Jan. 1958.
Popov, etal., Analog Readout System with Charge Division Type Output, 2001 IEEE Nuclear Science Symposium Conf. Record, San Diego, CA, Nov. 4-8, 2001, ISBN 0-7803-7326-x.
Popov, etal, Data Readout and Processing Toolkit for Small-size Gamma Cameras, 2006 IEEE Nuclear Science Symp. Conf. Record, vol. 5, Oct. 29-Nov. 1, 2006. USA.

* cited by examiner

*Primary Examiner* — David Porta
*Assistant Examiner* — Hugh H Maupin

(57) ABSTRACT

A fast neutron imaging apparatus and method of constructing fast neutron radiography images, the apparatus including a neutron source and a detector that provides event-by-event acquisition of position and energy deposition, and optionally timing and pulse shape for each individual neutron event detected by the detector. The method for constructing fast neutron radiography images utilizes the apparatus of the invention.

10 Claims, 5 Drawing Sheets

FAST NEUTRON IMAGING DEVICE AND METHOD

The United States government may have certain rights to this invention under Management and Operating Contract No. DE-AC05-06OR23177 from the Department of Energy.

FIELD OF INVENTION

The invention relates to an apparatus and method for fast neutron imaging which operates in an event-by-event counting mode, acquiring coordinate and energy information and optionally timing and/or pulse shape information for each detected neutron event.

BACKGROUND OF THE INVENTION

Fast neutron imaging is a technique in which neutrons from a point source penetrate through a sample under examination and show a shadow image when detected by a position sensitive detector. While the technique is similar in principle to some aspects of X-ray or gamma radiography, the cross sections of neutron interaction with nuclei differ significantly from those of X-ray or gamma interactions. Hence, it is possible to use fast neutrons to obtain images of light elements including, for example, a hydrogen rich material beneath a shield of lead or tungsten. Accordingly, fast neutron imaging is of considerable interest for non-destructive testing including material testing, medical and biological applications and cargo screening.

However, while the technique of fast neutron imaging was known prior to the present invention, the methods typically described in the literature involve integrating the detector response. In such methods many events of neutron interaction in a given small area of the detector produce an integrated local response that is displayed as a single piece of information after the exposure is complete. Individual events of neutron interactions are not recorded and therefore the images obtained cannot distinguish between neutrons of different energies and cannot separate backgrounds very well.

More specifically in the known methods of neutron imaging, detection is accomplished by means such as photographic film, image plates, amorphous silicon flat plate detectors, or CCD or similar electronic camera based systems with a neutron sensitive scintillator or position-sensitive photomultiplier tubes with optical fiber optic readout. Common shortcomings of these methods include the lack of neutron energy resolution or even the capability to set up a neutron energy threshold, and the impossibility to separate the neutron signal from such background noise contributions as x-ray or gamma radiation fields and/or thermal neutrons.

Prior to the present invention attempts to achieve event-by-event fast neutron imaging detection have included the use of gas field detectors and conventional photomultiplier tubes with plastic scintillators. These have manifested significant deficiencies with the former having low efficiency and the latter having limited position resolution.

SUMMARY OF INVENTION

The present invention provides a fast neutron imaging apparatus. The fast neutron apparatus of the invention comprises a neutron source and a detector that provides event-by-event acquisition of position and energy deposition, and optionally timing and/or pulse shape information for each individual neutron event detected by the detector. Additionally, the detector comprises a neutron sensitive scintillator in communication with at least one position sensitive optical photon sensor.

The invention further provides a method for fast neutron imaging using the apparatus of the invention and a fast neutron radiography image.

DETAILED DESCRIPTION OF THE INVENTION

Figure 1:
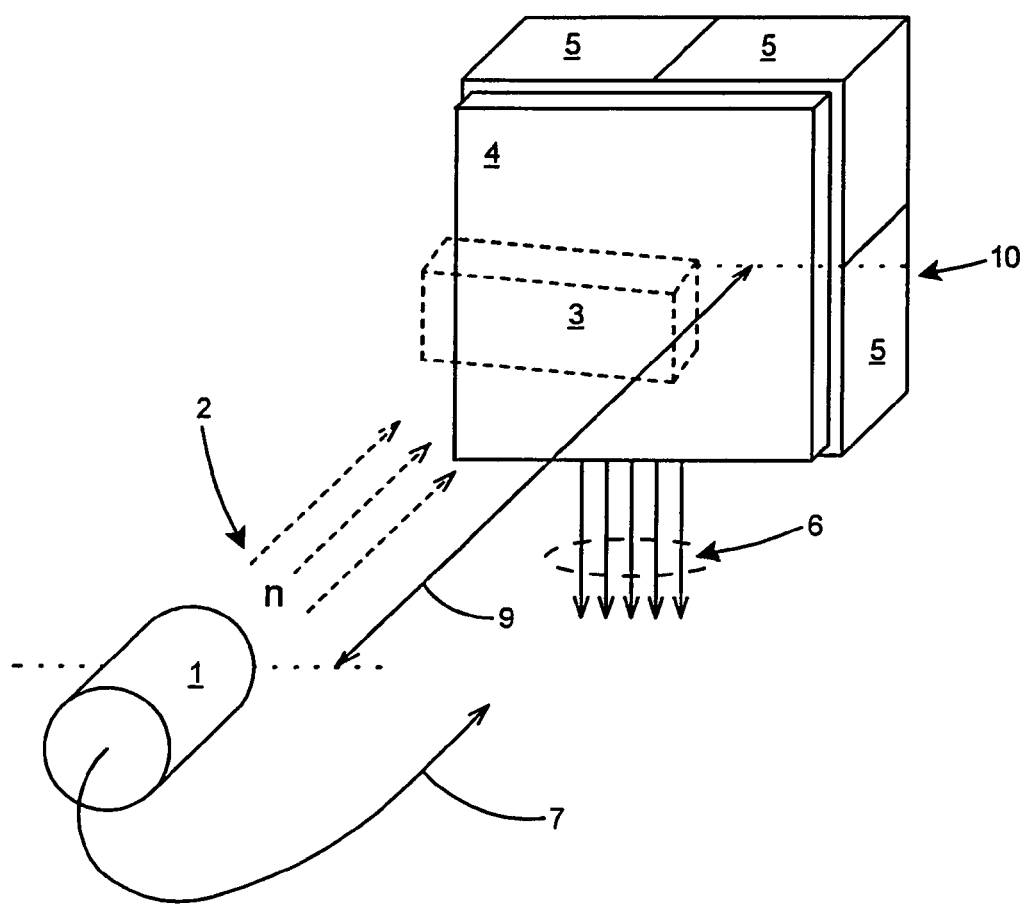
FIG. 1 shows a diagram of the fast neutron source and detector of an exemplary embodiment of the fast neutron imaging apparatus of the invention.

The invention is an apparatus and method for fast neutron radiography imaging. The non-destructive method of the invention is useful, for example, for a wide range of screening tests including medical and cargo screening and is complimentary to other types of radiography providing information on light element content of materials contained within an enclosure.

In contrast to prior art fast neutron imaging devices that operate in an integration mode, the apparatus of the present invention provides an event-by-event read out and data acquisition acquiring position (X and Y coordinates) and energy deposition and optionally timing and pulse shape information for each detected (e.g. neutron interaction) event. The present invention provides a neutron sensitive detection system that includes a slab or pixellated neutron sensitive scintillator attached to a position sensitive photon sensor. Energy, timing and/or pulse shape event information for each detected event may be used to separate events of fast neutron interactions in the scintillator from background events caused by electronic noise and/or other types of background radiation present including, but not limited to, gamma radiation, electrons and thermal neutrons. In one embodiment, a trigger-discriminator and optionally a pulse shape discriminator and/or constant fraction discriminator circuit is used to facilitate prompt gamma radiation rejection and time-of flight neutron energy measurement. Clean identification and selection of only fast neutron events in the final image allows substantially improved image contrast, energy and position resolution as compared to prior art fast neutron imaging devices which operate using signal integrating detection systems and in which events of fast neutron interaction are not separated from background. In contrast to the prior art, in the present invention, the image contrast resolution is limited only by the number of detected neutron events.

In one exemplary embodiment using 2.5 MeV neutrons from a point source Deuterium-Deuterium neutron generator, the event-by-event data collection in combination with position information provided by the "front-end" or detector electronics and the use of a position sensitive optical photon sensor non-uniformity correction previously described by Popov in U.S. Pat. No. 6,747,263 demonstrated spatial image resolution better than 0.5 (sigma) and good contrast ratio. (The U.S. Pat. No. 6,747,263 is incorporated herein by reference.)

As used herein event-by-event radiation detection (also referred to herein as "event-by-event detection") means the individual acquisition of position (X and Y coordinates) and energy deposition information, and optionally time and/or pulse shape for each individual event of interaction in which the energy deposition in the scintillator is above a predetermined threshold energy. Accordingly, event-by-event read out mode means that position and energy deposition information, and optionally time and/or pulse shape data is individually captured and transmitted for each event of interaction in which the energy deposition in the scintillator is above a predetermined threshold energy.

As used herein, a fast neutron is a neutron having an energy greater that a predetermined threshold energy and/or greater energy than a thermal neutron. Accordingly, a fast neutron event is a interaction event that results from the impact of a fast neutron having an energy greater than a predetermined threshold energy and/or greater energy than a thermal neutron on a detector (i.e. scintillator).

"Resolution" may be viewed as energy resolution, position resolution, spatial resolution and/or contrast resolution. The following example is given solely for the purpose of illustration and is not to be construed as a limitation of the present invention, as many variations thereof are possible without departing from the spirit and scope of the invention.

"Energy resolution" is a characteristic of how well energy deposited in the scintillator in the event of a fast neutron interaction can be measured. For example, if a fixed energy, say E0=2 MeV is deposited in the scintillator many times, the value measured by the system in each event may be different from E0. If a distribution of the measured values is plotted along an energy scale, the plot will be a bell-shaped curve around 2 MeV. Good resolution would be a narrow bell shape close around E0; lesser resolution would give a wider bell shape. To characterize the energy resolution numerically, it is common to use a Gaussian function fitting to the bell distribution. One of the parameters of the Gaussian, "sigma", corresponds to the width of the distribution. About ⅔ of all events would be found within the interval in energy (E0−sigma,E0+sigma). If the result of the fit shows that the sigma value best describing the data is 200 keV, then one would conclude that the "energy resolution" of the system is about 10%, or 200 keV (sigma) at 2 MeV.

"Position resolution" or "spatial resolution" are typically used interchangeably. Position or spatial resolution is a characteristic of how well the position of the interaction event along both the X and Y coordinates of the face of the detector (i.e. scintillator) is known. Similar to "energy resolution", the measured values (Xm,Ym) all of the interactions measured at a single point (X0,Y0) in the scintillator will be distributed around (X0,Y0) in a 2-dimensional bell shape that can be approximated by a 2-dimensional Gaussian with the two parameters of "position resolution", sigma_x and sigma_y. Using straight shadow edges along X or Y, one can determine sigma_y and sigma_xseparately. Thus the phrase "position resolution of the detector in both X and Y is better than 0.5 mm (sigma)" means that the values of the parameters sigma_x and sigma_y as described above, are both less than 0.5 mm.

"Contrast resolution" relates to the degree of how well the apparatus can distinguish different tones of gray in the image. The apparatus of the present invention can provide good contrast resolution given a sufficiently long measurement time because it operates in a counting mode.

FIG. 1 shows one exemplary embodiment of an event-by-event fast neutron imaging apparatus of the invention. Referring to FIG. 1, the apparatus comprises a neutron source 1. In one exemplary embodiment, the neutron source 1 emits a neutron beam 2 from an origin that is preferably of a small size that is point like. The neutrons in the beam 2 have trajectories that traverse a sample object 3 under investigation to reach a neutron sensitive scintillator 4 at a distance 9 from the neutron source 1. Upon passing though the sample 3 and reaching the scintillator 4, some of the neutrons will interact with the scintillator 4 and deposit a portion of their energy in it. Neutrons that interact with the sample 3 will be either knocked out of the beam, or absorbed in the sample 3, thus providing a shadow pattern at the face of the detector 10. The detail intensity and contrast of the shadow image of the sample 3 is dependent on the material composition and internal structure of the sample 3. Suitable neutron sensitive scintillators 4 include, but are not limited to, neutron sensitive scintillators in the form of slabs or pixilated scintillators.

The energy thus deposited in the scintillator 4 by an individual neutron interaction event is detected by a position sensitive optical photon sensor 5. The neutron sensitive scintillator 4 is optically coupled to the position sensitive optical photon sensor 5. The position sensitive optical photon sensor 5 may be a position sensitive photomultiplier tube(s) or a position sensitive photomultiplier array. Alternatively, an array of conventional photomultiplier tubes (hereinafter "photomultiplier tubes") arranged in a configuration to provide position and energy deposition for each individual fast neutron interaction with the scintillator 4 may be used. The position sensitive optical photon sensor 5 detects the energy deposition in the scintillator 4 if the amplitude of the signal is above a predetermined trigger level or threshold. Together the scintillator 4 and position sensitive optical photon sensor 5 comprise the detector 10.

A position sensitive photomultiplier tube with a small anode pad size and with corrected non-uniformity of gain is exemplary of a position sensitive optical photon sensor suitable for use in the apparatus of the invention. Such a photomultiplier tube can achieve sub-millimeter position resolution using techniques similar to the Anger camera as described in "Scintillation Camera" by Hal O. Anger in Review of Scientific Instruments, Volume 29, Number 1, January 1958 and incorporated herein by reference. Exemplary multi-tube array position sensitive photomultipliers suitable for use in the practice of the invention include Hamamtsu flat panel H8500 and H9500 position sensitive photomultiplier arrays. Such arrays are available from Hamamtsu Corporation 360 Foothill Road; Bridgewater, N.J. 08807.

Alternatively, the position sensitive optical photon sensor may be a position sensitive semiconductor optical photon sensor or an array of semiconductor optical photon detectors arranged to provide position and energy deposition information for each individual event of fast neutron interaction in the scintillator.

Figure 2:
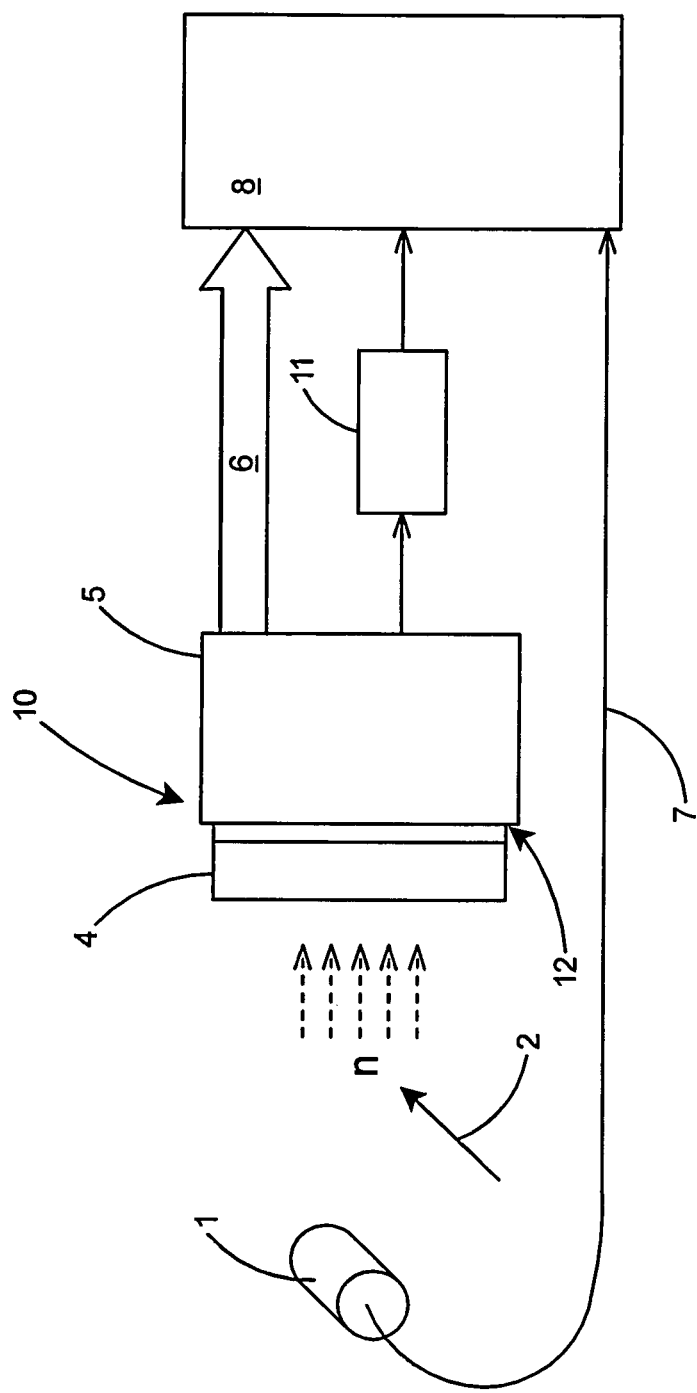
FIG. 2 shows a schematic diagram of an exemplary embodiment of the fast neutron imaging apparatus of the invention.

Referring to FIG. 2 which is a schematic diagram of an exemplary fast neutron imaging apparatus, FIG. 2 shows the neutron source 1, detector 10 and further comprises a discriminator 11 and a data output 6 that transfers position and signal amplitude (i.e. energy deposition) information, and optionally pulse shape and/or timing data from the detector 10 to a Data Acquisition System 8. The discriminator 11 and the data output 6 are referred to collectively herein as the "electronics front end circuit." A suitable discriminator 11 is a leading edge single threshold discriminator. Alternatively, advanced discriminator apparatus and techniques such as constant-fraction or pulse shape discriminator may be used. For an imaging system operated in the event-by-event mode, each individual event capture transmission to the Data Acquisition System 8 is initiated by the discriminator 11.

Optionally, the fast neutron imaging apparatus may include an optically transparent light guide or light spreader 12, placed between the scintillator 4 and the position sensitive optical photon sensor 5, providing optimal distribution of the scintillation light across the sensor area to improve the position resolution of the device.

Optionally, the position sensitive optical photon sensor 5 and/or the data output 6 may include a pulse amplitude weighing circuit that reduces the multitude of prime analog outputs to just four signals carrying the positional, energy and timing information for each individual interaction event. These four analog signals outputs may then be transmitted to the Data Acquisition System 8.

Optionally, the fast neutron imaging apparatus may further include a time stamp signal output 7 that provides time information from the neutron source 1 to the Data Acquisition System 8. Timing information from the neutron source 1 may be useful in embodiments in which the neutron source generates neutrons in short pulses. Referring to FIG. 1, the time of flight of a neutron over the distance 9 between the neutron source 1 and the scintillator 4 can be related to neutron energy.

The invention further includes a method for event-by-event fast neutron imaging. The method comprises providing a fast neutron imaging apparatus comprising a neutron source 1 and a detector 10. The detector 10 comprises a neutron sensitive scintillator 4 in communication with at least one position sensitive optical photon sensor 5 and provides event-by-event acquisition of position and energy and optionally timing and/or pulse shape for each individual neutron interaction event detected by the detector 10. The method further comprises producing a high energy neutron beam, directing the high energy neutron beam through a sample, detecting individual events of fast neutron interaction in the detector 10, and obtaining position and energy deposition information and optionally timing and/or pulse shape for each individual neutron interaction event.

The neutron beam is produced by a neutron source 1 and directed through a sample that is positioned between the neutron source 1 and the neutron sensitive scintillator 4. As neutrons of a sufficiently high energy in the beam interact and deposit part of their energy in the scintillator 4, a neutron interaction event occurs. If the deposited energy is above a predetermined threshold, the neutron interaction event is recognized by (i.e. detected by) the discriminator 11 circuit. The position and energy deposition and optionally timing and pulse shape for each individual neutron interaction event is detected by the position sensitive optical photon sensor and the data is individually captured and encoded for each neutron interaction event using the method disclosed in U.S. Pat. No. 6,747,262 to Popov (incorporated herein by reference) which includes gain non-uniformity correction. The thus captured position and energy deposition information and optionally timing and pulse shape data for each individual neutron interaction event having an energy greater than a predetermined threshold energy that is detected by the detector is encoded by the electronics front end circuit and transmitted via an electrical signal to a Data Acquisition Computer for processing into a fast neutron radiography image.

The data acquisition computer processes the individual data from each neutron interaction event from a plurality of individual events of fast neutron interactions in the detector and individual position and energy, and optionally timing and pulse shape data for each of the plurality of individual fast neutron interactions to form a fast neutron radiography image. In one exemplary embodiment, the fast neutron radiography image thus produced has a spatial resolution of at least about 0.5 mm (sigma) in both X and Y coordinates.

In some embodiments it is desirable to use at least one of energy, pulse shape and timing for each individual fast neutron interaction to separate individual fast neutron interactions from a detector background event. In some embodiments such separation provides improved quality of fast neutron radiography images.

Optionally in some embodiments, a time stamp signal output provides time information from the neutron source to the Data Acquisition System. Timing information from the neutron source may be useful in embodiments in which the neutron source generates neutrons in short pulses. Referring to FIG. 1, the time of flight of a neutron over the distance 9 between the neutron source 1 and the scintillator 4 can be related to the kinetic energy of individual neutrons. This energy information facilitates producing neutron radiography images in different ranges of fast neutron kinetic energy. Radiography images in different ranges of fast neutron kinetic energy may provide additional information regarding the material composition of sample.

EXAMPLE 1

The following example is one of many embodiments contemplated within the scope of the invention and is provided for the purpose of illustrating one of the many embodiments of the invention.

For the exemplary embodiment of the fast neutron imaging apparatus of Example 1a Deuterium-Deuterium type of neutron generator was used. The Deuterium-Deuterium type of neutron generator was obtained from Adelphi Technology, Inc. 2003 East Bayshore Rd., Redwood, Calif. 94063. The deuterium-deuterium neutron generator used a deuteron beam produced with RF plasma and acceleration voltage in the range of from 100 to 120 keV directed at a titanium-covered cathode which absorbs deuterons and works as a deuteron target. The neutron source was operated in continuous mode and produced up to about $10^9$ neutrons per second. The physics of the Deuterium-Deuterium reaction generates neutrons having a well defined energy maximum with a slight dependence on the emission angle. At a given beam direction, the neutron source can be considered to be a mono-energetic neutron source. For the exemplary tests described in Example 1, the detector was installed approximately at 90° to the direction of the internal deuterium beam direction. This apparatus and arrangement provided a beam of neutrons with energy of about 2.5 MeV.

Detection was accomplished using a plastic scintillator plate and a position sensitive photomultiplier array. The scintillator plate was made from a plastic scintillator type EJ-240 manufactured by Eljen Technology 1300 West Broadway, Sweetwater, Tex. 79556. The scintillator plate was a 49 mm by 49 mm square 4 mm thick. The position sensitive photomultiplier array was one Hamamatsu H9500 (Hamamtsu Corporation 360 Foothill Road; Bridgewater, N.J. 08807) position sensitive photomultiplier, equipped with data readout implementing a resistor matrix with non-uniformity correction as described by Popov in U.S. Pat. No. 6,747,263. (The U.S. Pat. No. 6,747,263 is incorporated herein by reference.) The position sensitive photomultiplier tube and the scintillator plate were optically coupled using a layer of silicon grease between the scintillator plate and the position sensitive photomultiplier tube. The position sensitive photomultiplier electronics included a pulse amplitude weighing circuit that reduced the prime 256 anode analog position sensitive photomultiplier tube outputs into 4 analog signals carrying positional, energy and timing information for each interaction event. These four analog outputs were connected to a dedicated data acquisition system of the type described by Popov et al. in "Analog Readout System with charge Division Type Output", 2001 IEEE Nuclear Science Symposium conference Record, San Diego, Calif., Nov. 4-8, 2001, ISBN 0-7803-7326-X. (Said referenced Popov et al. article is incorporated herein by reference.)

The imaging system was operated in an event-by-event detection or counting mode in which the X and Y coordinates (i.e. position), energy, and timing information for each individual detected interaction event between a neutron and the scintillator having an energy deposition above a predetermined threshold energy level was acquired. Data acquisition for each individual detected interaction event was initiated by a discriminator. For the tests described in Example 1, a leading edge single threshold discriminator was used.

Figure 3A:
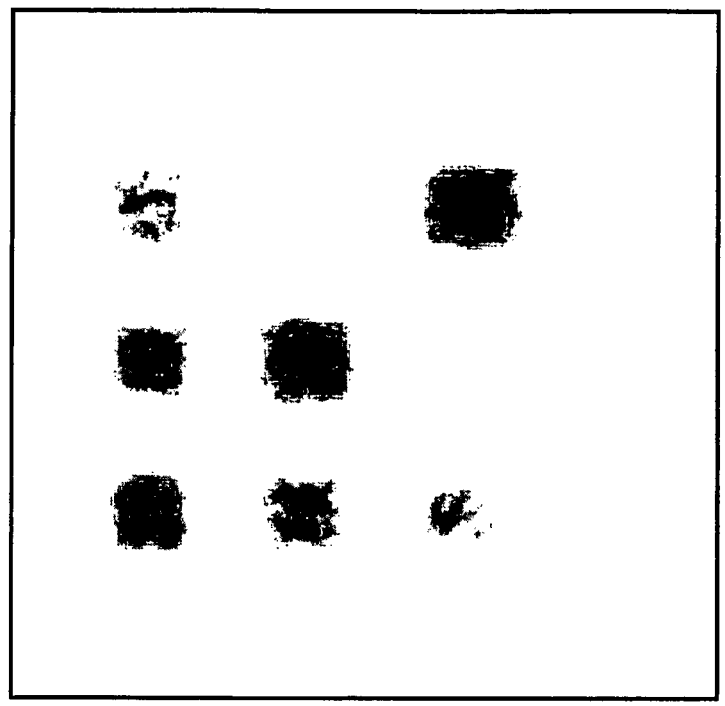
FIG. 3a shows a two-dimensional fast neutron radiography image of an exemplary sample with multiple plastic strips of varying lengths projecting from a base.
Figure 3B:
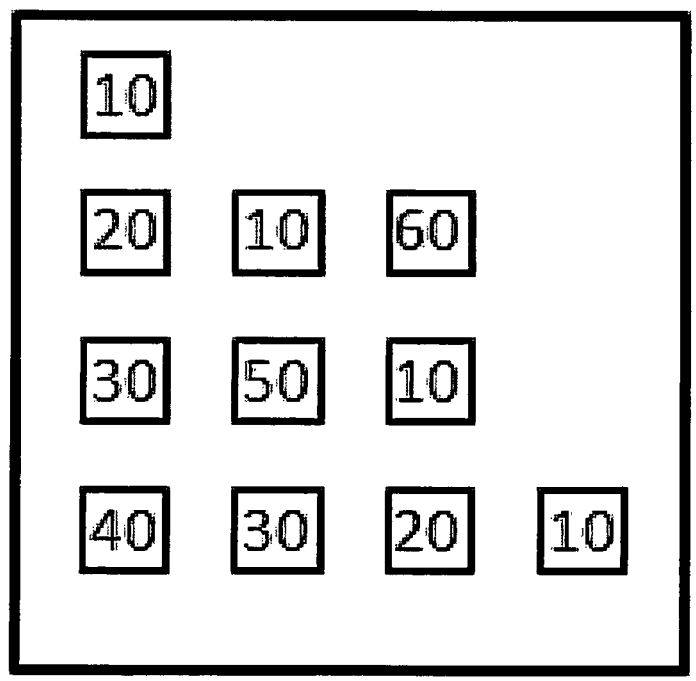
FIG. 3b shows a schematic diagram of the exemplary sample with multiple plastic strips of varying lengths projecting from a base of FIG. 3a. The printed number on the schematic diagram reflects the length of the plastic strip in mm at that position.
Figure 4:
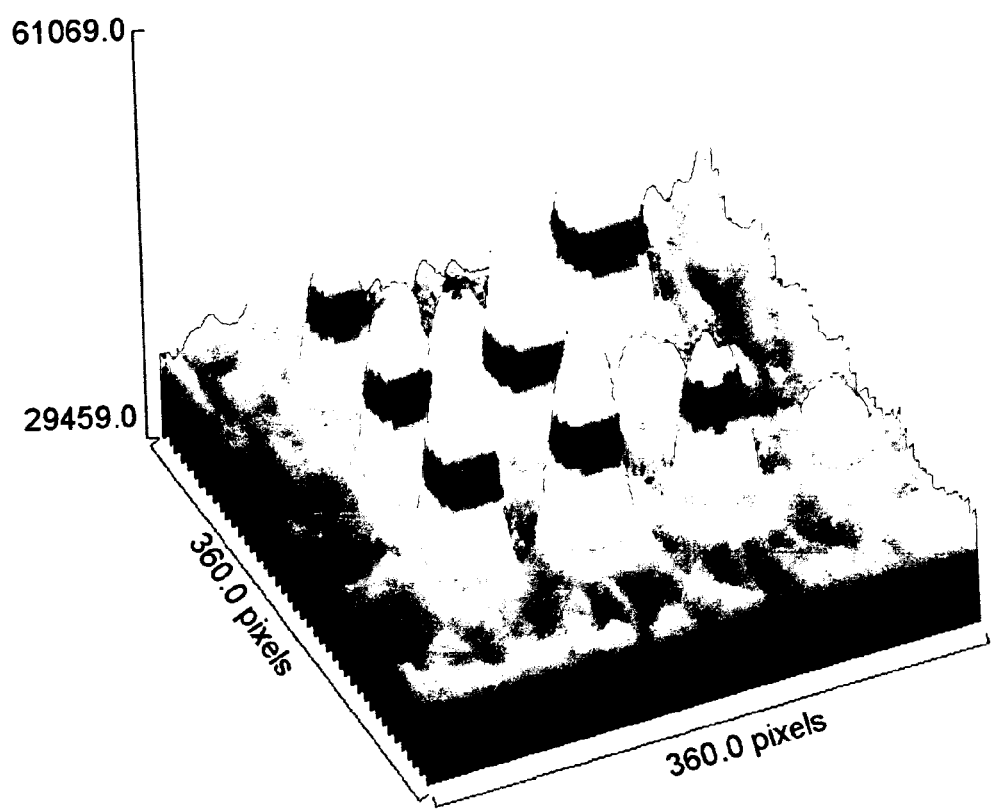
FIG. 4 shows a three-dimensional plot of the fast neutron radiography image of the exemplary sample of FIG. 3.

FIGS. 3a and 4 illustrate a sample fast neutron radiography image of a sample comprising eleven (11) styrene plastic strips of different lengths positioned vertically across a base analyzed with the apparatus of Example 1. FIG. 3a is a two-dimensional radiography image of the sample. FIG. 3b provides a schematic representation of the sample showing the positions of the eleven styrene plastic strips on the 4.8 mm×4.8 mm base with each number indicating the length of the plastic strip at that position. A three dimensional radiography image for the sample is provided in FIG. 4. The position resolution of the event-by-event fast neutron imaging apparatus of Example 1 is estimated to be less than 0.5 mm (sigma) based on the analysis of the edges of the strip shadows in the image. The contrast resolution can be evaluated visually from the edges of the strip shadows in the image. Referring to FIG. 4, the shadow densities are roughly proportional to the length of the strips, i.e. the shadow densities shown on FIG. 4 correlate with the height in mm for each strip as shown in FIG. 3b.

Figure 5:
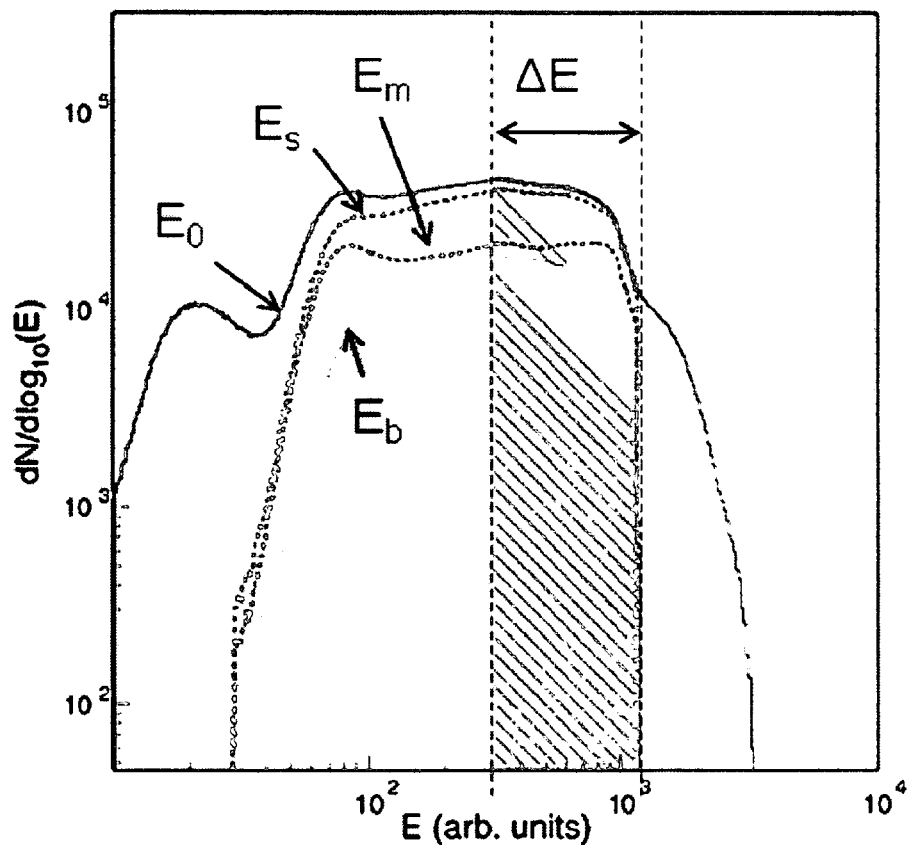
FIG. 5 shows exemplary energy spectra of the events contributing to the neutron radiography image of FIG. 4.

FIG. 5 shows energy spectra of the events corresponding to different selection cuts contributing to the fast neutron radiography image plot of FIG. 4. $E_0$ shows the distribution of all events recorded in the run, without any additional selection cuts. $E_s$ shows the energy distribution of events elected by the analysis software according to the quality of the recorded signals. The image of FIG. 4 was produced from the data associated with the energy interval $\Delta E$. The sharp fall of the energy spectrum at E (energy) of about 1000 corresponds to the maximum signal from the radiation event of the interaction of 2.5 MeV neutrons with the plastic scintillator. The upper limit of the energy selection range was chosen accordingly. The lower selection energy limit at E (energy) of about 300 was chosen to select events with large enough energy deposition to provide good spatial resolution of the image. $E_m$ and $E_b$ spectra illustrate the difference between the central portion of the detector and the parts of the detector close to the border of the detector where energy resolution gradually becomes worse for the sample of Example 1.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A method for Fast Neutron Imaging, comprising:
   (a) providing a fast neutron imaging apparatus comprising a neutron source, and a detector wherein the detector comprises a neutron sensitive scintillator optically coupled to at least one position sensitive optical photon sensor and wherein the detector acquires position and energy deposition information for each individual event of neutron interaction in the scintillator;
   (b) producing a fast neutron beam;
   (c) directing the fast neutron beam through a sample;
   (d) allowing the portion of said neutron beam that does not interact with the sample to pass from said sample to the scintillator without any filtering;
   (e) detecting individual neutron events in the scintillator; and
   (f) collecting position and energy deposition information for each individual event of neutron interaction in the scintillator.

2. The method of claim 1 wherein the position sensitive optical photon sensor comprises an array of photomultiplier tubes arranged to provide position and energy deposition information for each individual event of neutron interaction in the scintillator.

3. The method of claim 1 wherein the position sensitive optical photon sensor comprises a position sensitive photomultiplier tube.

4. The method of claim 1 wherein the position sensitive optical photon sensor comprises an array of semiconductor optical photon detectors arranged to provide position and energy deposition information for each individual event of neutron interaction in the scintillator.

5. The method of claim 1 wherein the position sensitive optical photon sensor comprises a position sensitive semiconductor optical photon detector.

6. The method of claim 1 wherein the detector further provides event-by-event acquisition of at least one of timing information and pulse shape information for each individual event of neutron interaction in the scintillator.

7. The method of claim 1 wherein the fast neutron imaging apparatus further comprises an electronics front-end circuit in communication with a plurality of outputs of the position sensitive optical photon sensor(s), and wherein the electronics front-end circuit provides event detection and event information encoding.

8. The method of claim 7 further comprising processing the position and energy deposition information for each individual neutron interaction event in a data acquisition computer in communication with the electronics front-end circuit.

9. The method of claim 7 wherein the detector has a detector gain dependent on position and wherein the electronics front-end circuit provides corrections to a positional non-uniformity of the detector gain.

10. A fast neutron radiography image with a spatial resolution better than 0.5 mm constructed from a plurality of individual events of fast neutron interactions in a detector and individual position, energy, timing and pulse shape data for each of the plurality of individual fast neutron interactions wherein at least one of energy, pulse shape and timing for each individual fast neutron interaction is used to separate individual fast neutron interactions from a detector background event.

* * * * *